United States Patent

Bacon et al.

[15] 3,676,867

[45] July 11, 1972

[54] USE OF MNALGE IN MAGNETIC STORAGE DEVICES

[72] Inventors: Donald Dingley Bacon, Somerset; Ethan Allen Nesbitt, Berkeley Heights; Richard Curry Sherwood, New Providence; Jack Harry Wernick, Madison, all of N.J.

[73] Assignee: Bell Telephone Laboratories, Incorporated, Murray Hill, Berkeley Heights, N.J.

[22] Filed: Dec. 7, 1970

[21] Appl. No.: 95,707

[52] U.S. Cl............340/174 YC, 340/174 AN, 340/174 HA, 340/174 TF, 346/74 MT, 148/31.55, 148/31.57, 75/134 G, 75/134 M, 75/134 N, 75/138, 117/235

[51] Int. Cl...................................G11c 11/14, G11c 11/42

[58] Field of Search..........340/174 TF, 174 YC; 346/74 MT; 148/31.55, 31.57; 75/134 G, 134 N, 134 M, 138; 117/235

[56] References Cited

UNITED STATES PATENTS 3,065,071 11/1962 Wernick.............................75/134 G

*Primary Examiner*—James W. Moffitt
*Attorney*—R. J. Guenther and Edwin B. Cave

[57] ABSTRACT

It has been found that vapor deposition of the ferromagnetic material MnAlGe onto a substrate will give a thin film having the easy direction of magnetization normal to the substrate. This unusual capability does not depend on epitaxial growth and, indeed, the preferred embodiment calls for the use of an amorphous substrate. This inherent property of MnAlGe makes it useful for the class of magnetic devices operating on the principle of the reversal of the direction of magnetization of isolated regions for the purpose of information storage.

10 Claims, 2 Drawing Figures

INVENTORS: D. D. BACON
E. A. NESBITT
R. C. SHERWOOD
J. H. WERNICK
BY: George S Indig
ATTORNEY

USE OF MNALGE IN MAGNETIC STORAGE DEVICES

BACKGROUND OF THE INVENTION

1. Field of the Invention

This invention relates to devices useful for the storage and retrieval of information. The device is based on the reversal of the magnetization of isolated regions in thin film ferromagnetic materials.

2. Description of the Prior Art

Storage of large amounts of information in a small space has received much attention in the past several years. An early system, disclosed in the U.S. Pat. No. 2,830,285 (issued Apr. 28, 1958), involves the use of a photographic film as the storage medium. Information is "written" into it by exposure and development. The stored information is "read" out of it by the passage through it of a light beam.

Subsequently, the use of MnBi as a medium for storage of information was described in Vol. 28, *Journal of Applied Physics*, pp. 1181–1184 (1957). MnBi is an unusual ferromagnetic substance, in that vapor deposition of this material even onto a glass substrate results in a film having the easy direction of magnetization normal to the surface of the film. Previously, workers had usually employed epitaxial growth to obtain magnetic films having the easy direction of magnetization normal to the substrate.

After magnetically saturating a film of MnBi parallel to the easy axis of magnetization, information may now be written on the film by reversing the magnetization of isolated regions; these will then correspond to information bits. The stored information may be read out optically, for example, in one of two ways; both depend on passing light through a polarizer and allowing this plane-polarized light to strike the surface of the film. The rotation of the transmitted portion of the incident radiation may be measured by placing the film between the polarizer and an analyzer; this is often called the Faraday rotation effect. Alternatively, the rotation of the reflected portion of the incident radiation may be measured by placing the analyzer on the same side of the film as the polarizer; this is often called the Kerr rotation effect. Examples of non-optical readouts include Hall pickup and induced voltage output; these techniques have been discussed in Vol. MAG-5, *IEEE Transactions on Magnetics*, pp. 544–553 (1969), for example.

Recent advances in the state of the art of storing and retrieving information have led to two primary methods for reversing the magnetic polarity of isolated regions. One involves reversing localized regions by heating them near or above the Curie temperature in the presence of an external field lower than and opposite to the coercive field of the surrounding material; this is called Curie point writing. The other involves reversing localized regions by exposing them to magnetic fields greater than and opposite to the coercive field of the surrounding material; one such method uses a needle-sharp stylus and, hence, this technique is sometimes called magnetic stylus writing. Another such method uses a two-dimensional array of cross-points, overlayed on the film, to achieve the same effect. Several variants of these methods are also known.

The information stored can be either in digital (e.g., binary) or analog (e.g., holographic) form. The storage can be either permanent, such that the remanent magnetization in the localized regions can be sensed by some means, or temporary, such that the writing influence must be present during readout. Finally, the readout can be destructive, such as by the induced voltage method, or nondestructive, such as by optical means.

While MnBi is one material useful as a storage device in the information systems described above, it is preferable, from an engineering standpoint, to have available several different materials having different magnetic and physical properties. Such a choice allows flexibility in selecting the proper material for a particular application.

SUMMARY OF THE INVENTION

In accordance with the invention, it has been found that vapor deposition of the ferromagnetic compound MnAlGe onto a substrate will give a film having the easy direction of magnetization normal to the substrate. The unusual effect does not depend on epitaxial growth; and, indeed, the preferred embodiment calls for the use of an amorphous substrate. This property, together with the physical and chemical stability of MnAlGe and its Curie temperature of 245° C, make it of device interest in digital information storage systems, such as described in Vol. 41, *Journal of Applied physics*, pp. 2530–2534 (1970).

The preparation of a film of MnAlGe may be carried out by any one of the usual vapor-deposition techniques, such as evaporation, sputtering, thermal decomposition, etc.; but the MnAlGe films are easily prepared by sputtering. One reason for preferring sputtering is that the composition of the film obtained can be more closely controlled, as compared with some of the other methods of vapor deposition.

DETAILED DESCRIPTION

1. The Figures Figures

Figures 1, 2:
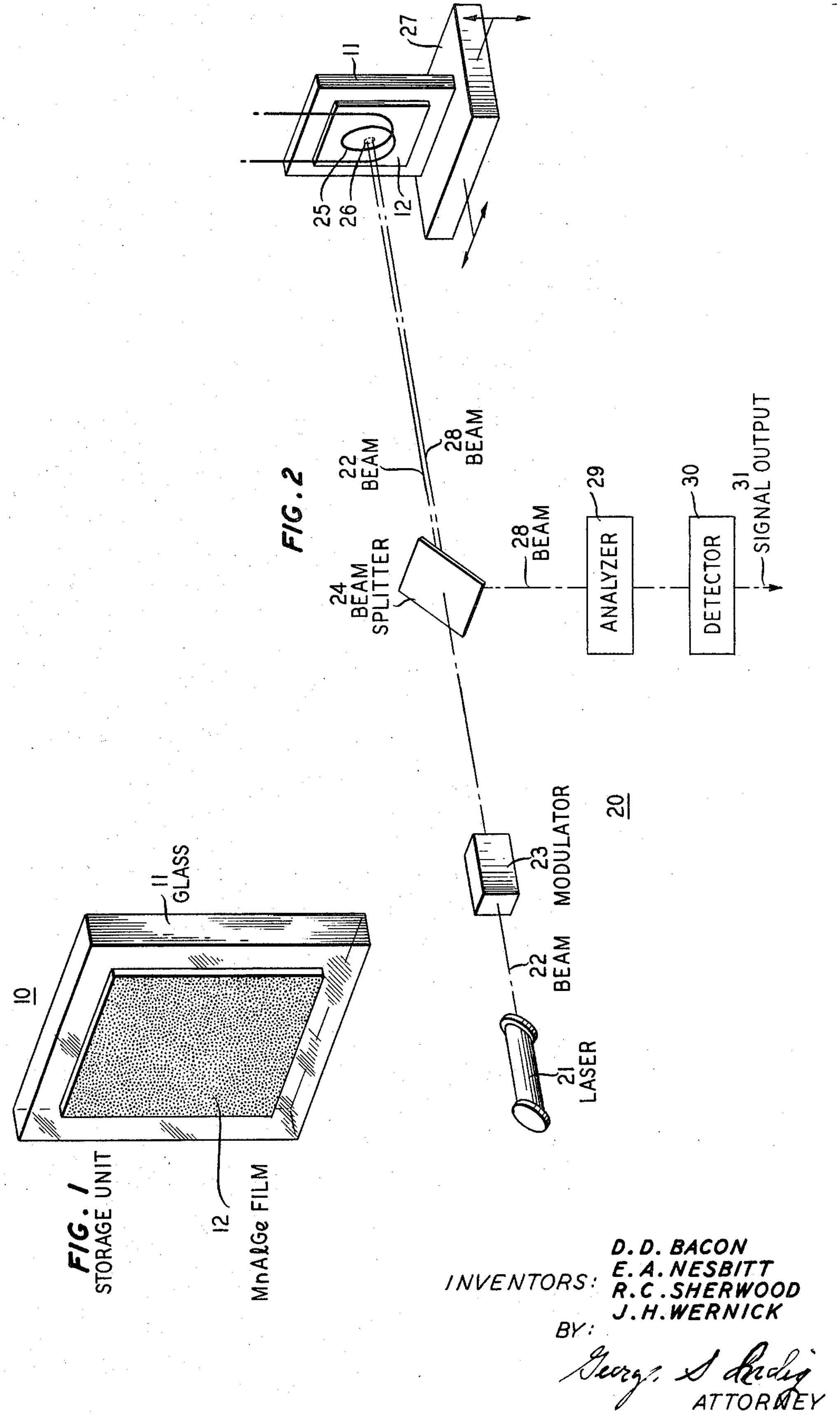
FIG. 1 is a perspective view of a storage device in accordance with the invention.
FIG. 2 is a schematic diagram, partly in block form and partly in perspective, showing apparatus for both writing information into the storage unit at a particular location and for reading information stored therein.

Referring now to the drawings, FIG. 1 shows a magnetic storage unit 10 consisting of a supporting plate 11 of some material, preferably a silicate glass, bearing on one face a thin film 12 of MnAlGe, having the easy direction of magnetization normal to the surface of the film.

FIG. 2 illustrates, in schematic form, simple apparatus 20 for both writing digital information in binary code onto the storage unit at a desired location and reading such stored information from the unit at any desired location. Other methods for both writing and reading information may also be visualized. For the purpose of illustration, the system described here records digital information by Curie point writing and employs an optical readout using the Kerr rotation effect. The laser 21, energized by some means not shown here, emits a beam 22 that is pulse modulated by modulator 23 to give a square pulse. A polarizing beamsplitter 24 serves as polarizer for the modulated beam 22 and pickoff for the returned read beam 28. A magnetic field coil 25, energized by some means not shown here, is located, for example, near the surface of the film 12 to provide a magnetic field for erasing and reversing domains in the localized region 26 which is heated by the laser beam to a temperature near or above the Curie temperature of the MnAlGe film. The coil 25 supplies a magnetic field lower than the coercive force of the film 12, thus only the heated localized region 26 will be affected and thereby reversed. The X–Y translator 27 is used to position the substrate 11 at the desired positions for writing and for reading. The light beam 22 undergoes a Kerr rotation depending on the magnetization of the localized region 26 on the film 12 and is reflected as the read beam 28, shown here for illustrative purposes as a separate beam, back to the polarizing beamsplitter 24 where it is deflected into analyzer 29 and then into the detector 30, where the resulting signal 31 may then be further processed. A more complete description of a similar system is found in Vol. 41, No. 6, *Journal of Applied Physics*, pp. 2530–2534 (1970), FIG. 5.

2. Preparatory Technique

The invention is premized on the observation that vapor-deposited films of MnAlGe are found to have the easy direction of magnetization normal to the surface of the substrate onto which they have been deposited. This property has been found to occur in MnAlGe films ranging from 300 A to at least 5,000 A in thickness. However, to obtain films both relatively transparent to visible radiation and relatively uniform across the surface, film thicknesses of from 700 to 1,000 A are preferred.

While any one of several vapor-deposition techniques may be used to obtain the desired film of MnAlGe, such as evaporation, sputtering, thermal decomposition, etc., the use of sputtering, especially d.c. getter sputtering, as described in Vol. 35, *Journal of Applied Physics*, pp. 554–555 (1964), is preferable since a lower level of impurities is obtained at the vacuum pressures used than would be obtained by other vapor-deposition methods at the same vacuum pressures. This procedure is thus economical, due to the higher pressures that can be tolerated in the vacuum chamber, and is esPecially effective in the control of the composition of the film.

Thin films of MnAlGe ranging from 700 to 1,000 A in thickness are sputtered onto a substrate under vacuum. The substrate can be any of the usual materials commonly used in the vapor deposition of films; successful films of MnAlGe have been prepared on, for example, single crystals of quartz, sapphire, mica, and potassium chloride, as well as on silicate glass and fused quartz. However, the preferred embodiment of the invention calls for the use of an amorphous substrate, such as silicate glass, for inexpensive commercial production.

The target for sputtering MnAlGe can be prepared, for example, by the technique reported by Wernick in Vol. 32, *Journal of Applied Physics*, p. 2495 (1961). Alternate processes are also known in the sputtering art; one can use a target of mixed powders of the elements or targets of the separate elements, for example. The use of Wernick's method, however, allows one to determine the final composition of the film more easily, since it will have the same composition as the target button. This composition can be varied as follows: $Mn_{0.8-1.2}Al_{0.8-1.2}Ge_{0.8-1.2}$. This range of composition is sufficient to give the properties desired.

A strip heater is used to support the substrate and to control its temperature. The temperature of the substrate can be varied from room temperature to 800° C, and films prepared in this temperature range are useful in the applications envisioned. However, a temperature of from 300° to 600° C is preferable since the highest degree of orientation of the easy direction of magnetization normal to the film is obtained in that temperature range.

a. Exemplary Preparation of an MnAlGe Film.

A silicate glass substrate, after being appropriately cleaned, was placed in a vacuum chamber. The MnAlGe film was deposited onto the glass substrate in a partial pressure of $7 \times 10^{-2}$ Torr of argon using 1,500 volts d.c. which resulted in a sputtering current of 10 milliamperes and a deposition rate of 115 A per minute. During the entire deposition, the glass substrate was maintained at 500° C by the tantalum strip heater. The source used was a button of MnAlGe. The resulting film of MnAlGe was 750 A thick and had a grain size of 2,000 A. The coercivity was found to be 2,200 oersteds, as measured normal to the surface of the film.

A series of other substrate temperatures were also tried, ranging from room temperature to 800° C, but the MnAlGe films so prepared had a higher coercivity and thus a lower degree of orientation of the easy direction of magnetization normal to the surface of the film than films prepared at 500° c.

3. Mechanism of Orientation of Easy Direction of Magnetization

Without necessary subscription to any particular theory, it is surmized that the origins of the favorable characteristics of the MnAlGe film are to be found in the following considerations.

The ternary composition MnAlGe has a tetragonal lattice structure. It also has a large uniaxial magnetocrystalline anisotropy, with the easy axis of magnetization lying along the tetragonal *c*-axis. In the prescribed preparation of the film, the crystals tend to grow with their *c*-axes normal to the plate on which the crystals are grown. Thus, the crystal growth, which apparently takes place during deposition at the heating temperatures described above, acts to produce a film in which the *c*-axes of the majority of the crystals are normal to the film.

4. Device Use a. Information Storage

The following description of the application of a film of MnAlGe in a device of practical interest is given in terms of Curie point writing and magneto-optical reading, merely as an example to demonstrate its usefulness in information storage systems. Certainly other techniques of writing information common to the art can also be visualized, as well as techniques for reading information, such as Hall pickup, induced voltage output, and the like.

While any one domain of an unsaturated film thus fabricated may serve for the practice of the invention, it is preferred to ensure that the entire film surface, over as great an area as desired, shall initially be saturated in the same direction. To ensure this result, it is preferred to pole the specimen, either prior or subsequent to its removal from the vacuum chamber. It is conventional to pole the specimen near the Curie temperature with a low magnetic field. Poling at lower temperatures than this will, of course, require greater magnetic fields.

Information may now be written onto the film by any number of means, all relating to reversing the magnetic poles of a localized region. One well-known technique, used for storing data in digital form, is described in Vol. 28, *Journal of Applied Physics*, pp. 1181–1184 (1957); the technique employs a magnetic stylus having a needle-sharp tip, operated at a field greater than the coercive force. In one experiment using a film of MnAlGe as prepared above, spots having a diameter of 50 micrometers were written on the film; this suggests that one can obtain 200,000 bits per square centimeter.

More recently, Curie point writing, another technique also usually used for storing data in a digital form, has been developed and is described, for example, in Vol. 41, *Journal of Applied Physics*, pp. 2530–2534 (1970). A source of heating, such as an argon-ion laser with a wavelength of 4,880 A, can be used to heat localized regions of the film of MnAlGe above its Curie temperature of 245° C. The magnetization of the heated region after cooling can be reversed by the influence of the demagnetizing field developed by the surrounding area. However, the usual practice is to apply an external field; that field, of course, must be smaller than the coercive force of the unheated area. The heating may be done with a heated pen, an electron beam, or a laser beam. When a laser beam is used, the diameter of the heated region can be made comparable to the laser wavelength. Furthermore, the choice of optics will affect the size of the spots. Thus, using the laser described above, operated at 100 milliwatts with a pulse length of 50 microseconds and a beam diameter of 10 micrometers, spot sizes of 25 micrometers were written on the MnAlGe film prepared according to the procedures described above; using other optics or lasers operating at other wavelengths, spot sizes down to 1 micrometer and less can be achieved.

b. Information Retrieval

It is characteristic of any magnetic film with a magnetic moment normal to its surface that it rotates the plane of polarization of incident plane-polarized light in one direction or the other, depending on the direction of magnetization. For any particular film, the degree of rotation depends on its thickness.

A film having regions of reversed magnetization may be read, for example, by some sort of optical means employing a polarizer to produce plane-polarized light and an analyzer to detect the rotation of that light following reflection or transmission of the light beam incident on the magnetic film. Thus, the analyzer can be adjusted, for example, for extinction of the light transmitted through or reflected from the parts of the film affected by the writing mechanism, in which case the visual contrast between the light transmitted through or reflected from the unaffected parts and that transmitted through or reflected from the affected parts is maximized.

The Curie point writing technique and the optical readout technique, as described in detail above, are intended to be exemplary only. It should be obvious to the skilled practitioner in the art that other methods for both writing and reading information onto the storage unit can also be employed in addition to those described above.

What is claimed is:

1. An article comprising a film of a ferromagnetic material which is vapor deposited onto a substrate, said film having the easy direction of magnetization substantially normal to the surface of said film, characterized in that said film is comprised of an essentially homogeneous composition having atomic proportions indicated by the formula: $Mn_{0.8\text{-}1.2}Al_{0.8\text{-}1.2}Ge_{0.8\text{-}1.2}$.

2. The article of claim 1 in which said formula is: $Mn_{0.9\text{-}1.1}Al_{0.9\text{-}1.1}Ge_{0.9\text{-}1.1}$.

3. The article of claim 1 in which said vapor deposition is accomplished by sputtering onto an amorphous substrate maintained at a temperature of from 300° to 600° C.

4. The article of claim 1 in which first means are provided for the storage of information by affecting the magnetization of selected portions of said film.

5. The article of claim 4 in which second means are provided for the retrieval of said information by sensing said selected portions of said film.

6. The article of claim 5 in which said second means include providing for transmitting a substantial fraction of plane-polarized radiation incident on said film therethrough.

7. The article of claim 6 in which said second means depends upon the degree of rotation of said transmitted beam.

8. The article of claim 5 in which said second means depends upon the degree of rotation of plane-polarized radiation incident on said film.

9. The article of claim 4 in which said first means include provision for heating selected localized regions of said film to reduce the coercivity of said film and for simultaneously applying a magnetic field to reverse magnetization of said regions.

10. The article of claim 9 in which the range of said heating includes the Curie temperature of the material.

* * * * *